United States Patent
Lin et al.

(10) Patent No.: US 7,339,994 B2
(45) Date of Patent: Mar. 4, 2008

(54) METHOD AND APPARATUS FOR FAST CONVERGENT POWER CONTROL IN A SPREAD SPECTRUM COMMUNICATION SYSTEM

(75) Inventors: Wei Lin, San Diego, CA (US); Daniel Jeng Hsia, Rancho Santa Fe, CA (US)

(73) Assignee: Texas Instruments Incorporated, Dallas, TX (US)

( * ) Notice: Subject to any disclaimer, the term of this patent is extended or adjusted under 35 U.S.C. 154(b) by 763 days.

(21) Appl. No.: 10/303,463

(22) Filed: Nov. 25, 2002

(65) Prior Publication Data

US 2004/0202242 A1    Oct. 14, 2004

(51) Int. Cl.
  H04B 1/66   (2006.01)
  H04B 15/00  (2006.01)
  H04B 17/00  (2006.01)

(52) U.S. Cl. .................. 375/240.27; 375/285; 375/284; 455/63.1; 455/522; 455/67.11

(58) Field of Classification Search .. 455/226.1–226.4, 455/115.3, 296, 11.1, 13.5, 63.1, 522, 67.11, 455/501, 67.13, 513, 67.14, 514, 115.2; 370/252, 311, 320, 318, 317; 375/130, 140, 375/146, 147, 144, 148, 295, 240.26, 240.27
See application file for complete search history.

(56) References Cited

U.S. PATENT DOCUMENTS

| | | | |
|---|---|---|---|
| 5,267,262 A | 11/1993 | Wheatley, III | |
| 5,564,074 A | 10/1996 | Juntti | |
| 5,590,409 A | 12/1996 | Sawahashi et al. | |
| 5,604,766 A | 2/1997 | Dohi et al. | |
| 5,631,921 A | 5/1997 | Schilling | |
| 5,722,051 A | 2/1998 | Agrawal et al. | |
| 5,745,520 A | 4/1998 | Love et al. | |
| 5,790,533 A | 8/1998 | Burke et al. | |
| 5,839,056 A | 11/1998 | Häkkinen | |
| 5,960,361 A | 9/1999 | Chen | |
| 5,991,636 A | 11/1999 | Won et al. | |
| 6,032,026 A | 2/2000 | Seki et al. | |
| 6,154,450 A | 11/2000 | Wallentin et al. | |
| 6,212,399 B1 | 4/2001 | Kumar et al. | |
| 6,259,927 B1 | 7/2001 | Butovitsch et al. | |
| 6,259,928 B1 | 7/2001 | Vembu | |

(Continued)

FOREIGN PATENT DOCUMENTS

WO    WO 98/45962    10/1999

*Primary Examiner*—David C. Payne
*Assistant Examiner*—Linda Wong
(74) *Attorney, Agent, or Firm*—Steven A. Shaw; W. James Brady; Frederick J. Telecky, Jr.

(57) ABSTRACT

A system and method for adjusting the power control target for a spread-spectrum communication system is disclosed. A preferred embodiment comprises correcting the power control target based upon the estimated slope of the SIR versus quality of service (QoS) curve under current operating conditions. By using the estimated slope of the current SIR versus QoS curve, the power control target converges to the desired value most quickly, and the SIR target overshoot or undershoot is maximally avoided, and the power rise is minimized, thereby reducing power requirements and signal dropouts. The invention finds application, for example, in personal communication devices such as cellular telephones and may be implemented using a digital signal processor (DSP).

29 Claims, 4 Drawing Sheets

U.S. PATENT DOCUMENTS

| | | |
|---|---|---|
| 6,285,887 B1 | 9/2001 | Mimura |
| 6,292,519 B1 | 9/2001 | Popovic |
| 6,337,988 B1 | 1/2002 | Agin et al. |
| 6,341,224 B1* | 1/2002 | Dohi et al. .................. 455/522 |
| 6,347,083 B1 | 2/2002 | Nishino |
| 6,347,231 B1 | 2/2002 | Miya |
| 6,385,183 B1 | 5/2002 | Takeo |
| 6,445,930 B1 | 9/2002 | Bartleme et al. |
| 6,529,482 B1* | 3/2003 | Lundby ..................... 370/252 |
| 6,535,532 B1* | 3/2003 | Ackerman et al. ............ 372/32 |
| 6,751,199 B1* | 6/2004 | Sindhushayana et al. ... 370/252 |
| 6,823,005 B1* | 11/2004 | Chuang et al. ............. 375/227 |
| 6,829,470 B2* | 12/2004 | Kogiantis et al. ........... 455/101 |
| 6,925,113 B2* | 8/2005 | Kim et al. .................. 375/227 |
| 2002/0034215 A1 | 3/2002 | Yanagi |
| 2002/0051482 A1 | 5/2002 | Lomp |
| 2003/0148769 A1* | 8/2003 | Chi et al. ................... 455/453 |
| 2004/0087327 A1* | 5/2004 | Guo .......................... 455/522 |

\* cited by examiner

METHOD AND APPARATUS FOR FAST CONVERGENT POWER CONTROL IN A SPREAD SPECTRUM COMMUNICATION SYSTEM

CROSS-REFERENCE TO RELATED APPLICATIONS

This application is related to the following co-pending and commonly assigned patent applications: Ser. No. 10/303,986 filed concurrently herewith and entitled "Method and Apparatus for Low Power-Rise Power Control Using Sliding Window Weighted QOS Measurements" and Ser. No. 10/303,189 filed concurrently herewith and entitled "Method and Apparatus for Setting the Threshold of a Power Control Target in a Spread Spectrum Communication System." Both of these applications are hereby incorporated herein by reference.

TECHNICAL FIELD

The present invention relates generally to a system and method for power control in a communication system, and more particularly to a system and method for updating the power control target to achieve fast convergence and reduce power-rise by using an algorithm to find an estimated slope and correcting the power control target based upon the estimated slope.

BACKGROUND

Power control is commonly used in communication systems for minimizing transmission power while maintaining the received signal quality at the desired level. In a code division multiple access (CDMA) spread spectrum communication system, since one user's signal contributes to other users' noise, power control is essential to mitigate the near-far problem and improve the system capacity. Furthermore, in order to minimize power consumption while ensuring a specified minimum quality of service (QoS) under varying channel conditions, the power control target, which is typically a threshold for the received signal to interference ratio (SIR), is updated autonomously to adapt to the change of communication environments. The QoS is typically specified in terms of a block error rate (BLER) or a bit error rate (BER). Examples of such communication systems include those operating under the IS-95, IS-2000, UMTS/WCDMA and TD-SCDMA standards.

For example, in a UMTS/WCDMA system (the UMTS/WCDMA standard can be found at http://www.3gpp.org), an open loop power control scheme is used for determining an initial transmission power at the start of a transmission. A closed loop power control scheme is used to adjust the ongoing transmission power to warrant the specified minimum QoS. The closed loop power control scheme includes both an inner loop power control system and an outer loop power control system. The inner loop power control system in a receiver estimates the received SIR and compares it to the power control target $SIR_{target}$. If the estimated SIR is greater than the target $SIR_{target}$, the receiver generates a power down command that is sent to the transmitter. Conversely, if the estimated SIR is lower than $SIR_{target}$, the receiver generates a power up command that is sent to the transmitter. The transmitter then adjusts the transmission power based on the decoded received power control commands. This inner loop power control system operates at a 1,500 Hz update rate. The outer loop power control system uses an algorithm to control $SIR_{target}$ by adjusting it such that the specified minimum QoS is achieved at minimum power all the time.

A significant concern in the $SIR_{target}$ update algorithm is the resulting power-rise. Power rise is a non-negative quantity defined as the difference between the actual average transmitted power for the specified QoS and the minimum transmitted power required to meet the specified minimum QoS. The smaller the power-rise, the better the $SIR_{target}$ update algorithm for several reasons. A larger power-rise results in reduced system capacity due to the nature of a spread spectrum communication system. This excess transmitted power reduces the battery life for a PCD such as a cellular telephone. The excess transmitted power also produces additional interferences to other PCDs.

If the transmitted power is lower than that required to warrant the specified minimum QoS, communication will suffer a high error rate or even experience dropouts.

To reduce power-rise, the power control target is expected to be as constant as possible if the communication channel conditions are steady. On the other hand, when the communication channel conditions are changing, the power control target is expected to follow as fast as possible.

A prior art $SIR_{target}$ update algorithm 100 is illustrated in FIG. 1a. In the prior art, a receiver would receive a series of data blocks, one block at each time. Each block can be determined as good block or bad block based on, for example, the result of a CRC check. Upon decoding the current data block, the block would be checked for errors 102. If an error occurred, the $SIR_{target}$ update algorithm would step up $SIR_{target}$ by an integer multiple K of a fixed increment Δ104. If no error occurred, the $SIR_{target}$ update algorithm would step down $SIR_{target}$ by the fixed increment Δ106. By using fixed increments, significant overshoot and undershoot occurred. It should also be noted that this prior art $SIR_{target}$ update algorithm bases its $SIR_{target}$ update on just the current data block. This memory-less operation will produce large power-rise under steady channel conditions when the $SIR_{target}$ is expected to be as constant as possible.

An alternative $SIR_{target}$ update algorithm is based upon the proportional-integral-derivative (PID) controller as shown in FIG. 1b. This approach filters the difference between the specified minimum QoS and the actual QoS and then updates $SIR_{target}$ based upon this difference. It should be noted that in this prior art the actual QoS is computed from all the previously received data blocks. Under varying channel conditions, the $SIR_{target}$ is expected to track and compensate the change of channel as quickly as possible. This full-memory operation, however, responds slowly to the change of channel conditions. The slow convergence of the power control target to the desired target value results in significant overshoot and undershoot, and therefore high power-rise.

Thus there exists a strong need to reduce the power-rise in a power-controlled communication system by improving the convergence speed in the $SIR_{target}$ update algorithm.

SUMMARY OF THE INVENTION

These and other problems are generally solved or circumvented, and technical advantages are generally achieved, by preferred embodiments of the present invention that reduce the target SIR $SIR_{target}$ overshoot and undershoot. By avoiding $SIR_{target}$ overshoot or undershoot, the present invention reduces power consumption by the PCD and minimizes interference with other PCDs.

In a first embodiment, the present invention includes a process for updating a current target signal to interference ratio (SIR) in a communication system. An actual error rate is received. The current target SIR is then updated based on the actual error rate and a slope of at least one reference curve (preferably two). The reference curve corresponds to error rates as a function of signal to interference ratios for the communication system.

In accordance with another embodiment of the present invention, a method for updating the target $SIR_{target}$ comprises storing at least a first table of SIRs as a function of error rates in a communication system under a first reference channel condition and storing at least a second table of SIRs as a function of error rates under a second reference channel condition. An actual error rate $Err_{act.}$ is received and an expected error rate $Err_{exp.}$ is also received. A weighting ratio is computed as a function of a current target signal to interference ratio $SIR_{target}$, a signal to interference ratio $SIR_{QoS*}$ from the first table corresponding to $Err_{act.}$ and a signal to interference ratio $SIR_{ref.,QoS*}$ from the second table corresponding to $Err_{act.}$. An estimated slope is then computed as a function of the weighting ratio, a signal to interference ratio $SIR_{QoS}$ from the first table corresponding to $Err_{exp.}$, $SIR_{target}$, a signal to interference ratio $SIR_{ref.,QoS}$ from the second table corresponding to $Err_{exp.}$ and $SIR_{ref.,QoS*}$. A correction factor $\Delta_{SIR}$ is computed as a function of the estimated slope and a first predetermined constant $k_1$ when the target SIR is determined to go up and a second predetermined constant $k_2$ when the target SIR is determined to go down. The target signal to interference ratio can then be updated based upon $\Delta_{SIR}$.

An advantage of the preferred embodiment of the present invention is that it improves the power control target convergence speed and reduces power-rise that consumes transmission power in a PCD. By minimizing transmission power, a battery's operating time in a PCD can be extended.

A further advantage of preferred embodiments of the present invention is that by improving the power control target convergence speed and minimizing power-rise, more PCDs can operate from a single base station while maintaining a specified minimum QoS, respectively. This increase in the number of PCDs for each base station reduces the number of required base stations, thereby reducing overall communication system costs.

Yet another advantage of the preferred embodiment of the present invention is that by improving the power control convergence speed and reducing power-rise, self-generated interference is reduced. By reducing self-interference, a specified minimum QoS can be maintained at lower transmission power levels.

An advantage of preferred embodiments of the present invention is that by improving the power control target convergence speed and reducing $SIR_{target}$ undershoot, signal dropouts are reduced. By reducing the number of signal dropouts, a specified minimum QoS can more readily be maintained.

The foregoing has outlined rather broadly the features and technical advantages of the present invention in order that the detailed description that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWING

For a more complete understanding of the present invention, and the advantages thereof, reference is now made to the following descriptions taken in conjunction with the accompanying drawing, in which.

DETAILED DESCRIPTION

The process and a system for implementing this process of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a personal communication device (PCD). The invention may also be applied, however, to other communication systems.

Figure 1A:
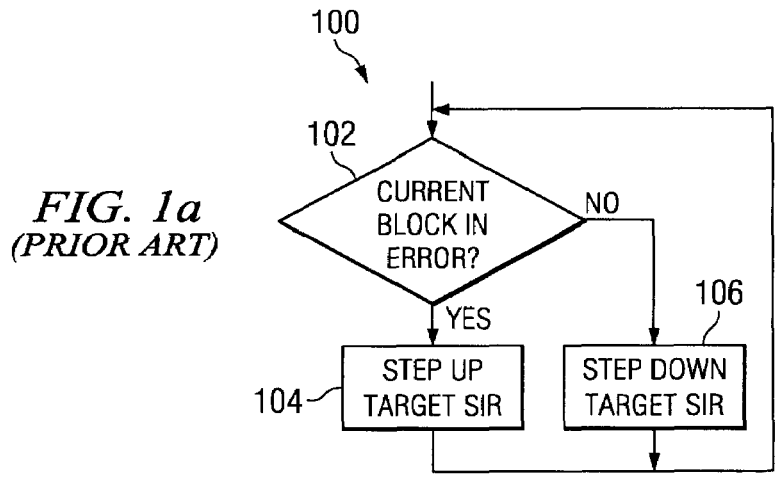
FIG. 1a is a flowchart of the prior art target SIR control system.
Figure 1B:
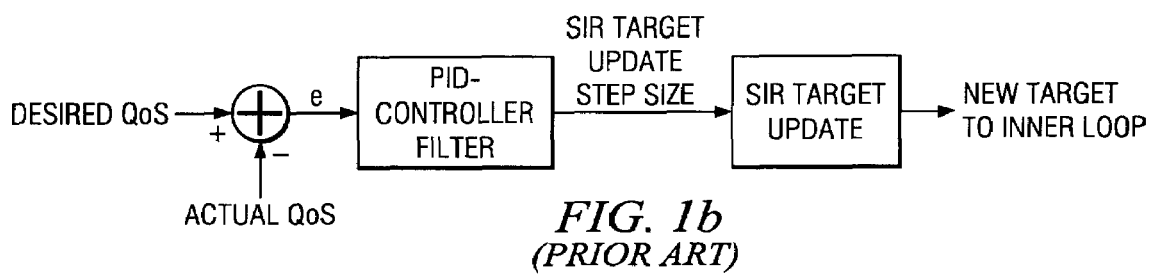
FIG. 1b is a block diagram of a portion of a prior art communication system.
Figure 2:
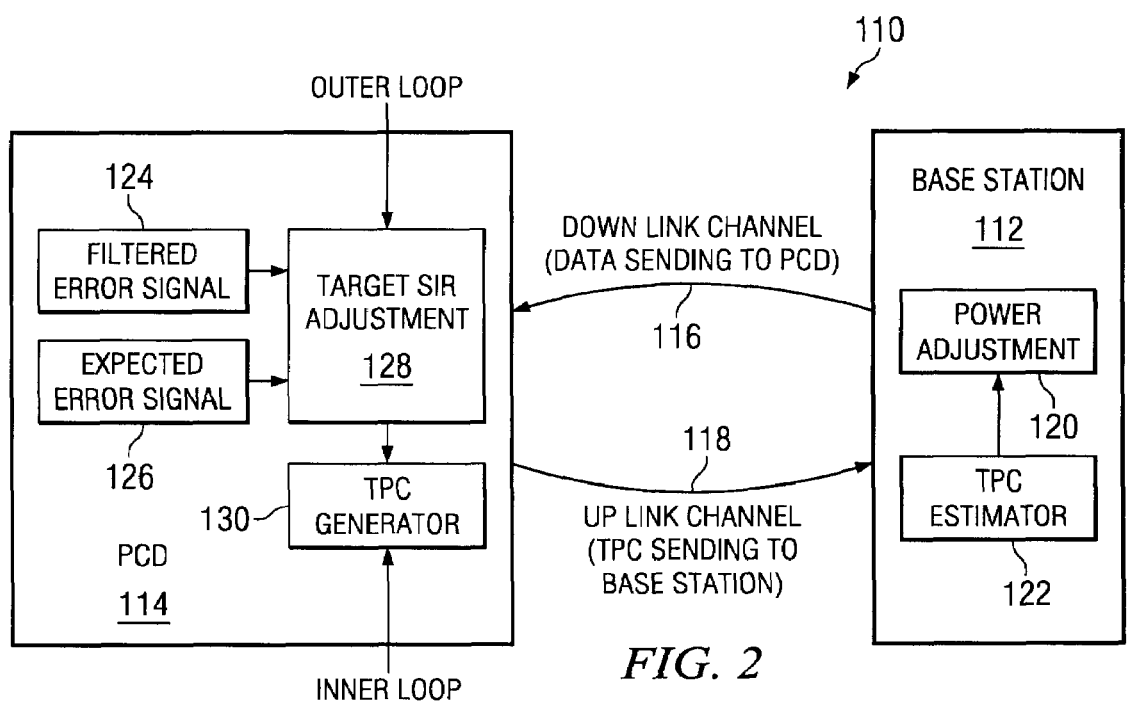
FIG. 2 is an overview of a telecommunications system that can incorporate an embodiment of the present invention.

FIG. 2 shows an overview of a communication system 110. The system includes both a base station 112 and a PCD 114. The base station 112 and the PCD 114 transmit and receive data via a down link channel 116 and an up link channel 118. Performance of the base station 112 is optimized in part by a power adjustment 120 based on the instructions from a transmission power command (TPC) estimator 122. The TPC is transmitted from the PCD. Performance of the PCD 114 is optimized in part by updating the target signal to interference ratio ($SIR_{target}$) in an outer loop power control and generating the TPC in an inner loop power control. This optimization requires estimated slope data 124, expected error rate data 126, target SIR update data 128 and a TPC generator 130. The estimated slope data 124 is used for target SIR update data 128. The expected error rate data 126 is used in target SIR update data 128. Lastly, the target SIR update data 128 is used in the TPC generator 130.

Figure 3:
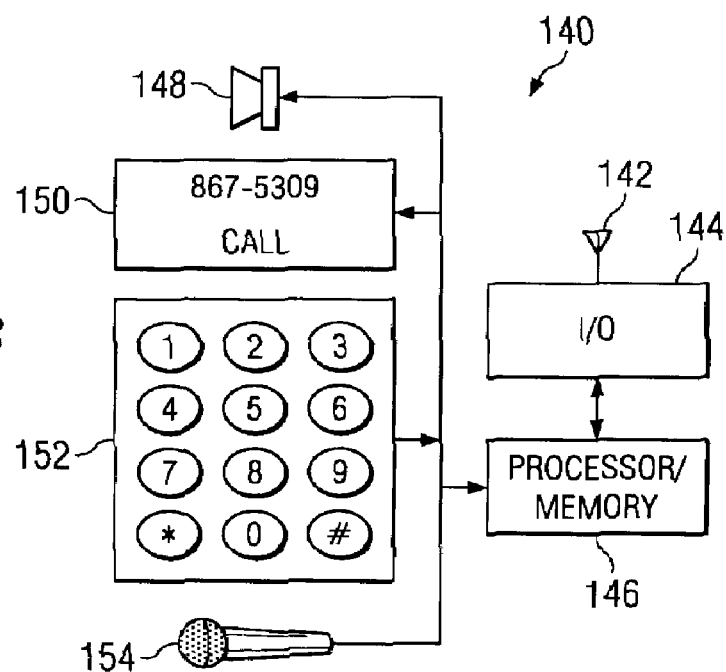
FIG. 3 is a an overview of a personal communication device that can incorporate an embodiment of the present invention.

An example PCD 114 in the form of a cellular telephone 140 is illustrated in FIG. 3. The cellular telephone 140 includes an antenna 142, an input/output section 144, a processor/memory unit 146, a speaker 148, a display panel 150, a keypad 152 and a microphone 154. Data frames are received by the antenna 142, modified by the input/output section 144 and provided to the processor/memory unit 146. The processor/memory unit 146 may also receive data from the keypad 152 or the microphone 154. The processor/memory unit 146 may display data on the display panel 148 or output sounds to the speaker 148. While the processor/ memory unit 146 is illustrated as a single element, a separate processor and a separate memory may also be used. A digital signal processor (DSP) may also be used as the processor/memory unit 146.

As the specified minimum quality of service (QoS) is frequently a function of, or equal to, the block error rate (BLER) or the bit error rate (BER), the BLER will be used to represent the QoS without loss of generality throughout the remainder of this description. A BLER of 1% may be adequate for voice-only communication applications while a BLER of 10% or better will typically be required for data communication applications.

The PCD 114 receives a series of data frames from the base station 112 via the down link channel 116. After processing the series of data frames, actual error rate data is calculated. This actual error rate data preferably includes the number of blocks in error and the total number of blocks in a data frame, thereby allowing calculation of the actual BLER, $Err_{act.}$. In addition, the PCD 114 must establish the expected BLER data, $Err_{exp}$.

During actual operation, the $SIR_{target}$ for the PCD 114 will vary as operating conditions change in order to guarantee the QoS. These changes may be caused, for example, by changes in the distance between the PCD 114 and the base station 112, increases or decreases in the number of PCDs in use for a given base station 112, changes in topology (including intervening hills or buildings) and changes in the speed. The PCD 114 must therefore update the $SIR_{target}$ as quickly as possible to minimize power-rise.

Figure 4A:
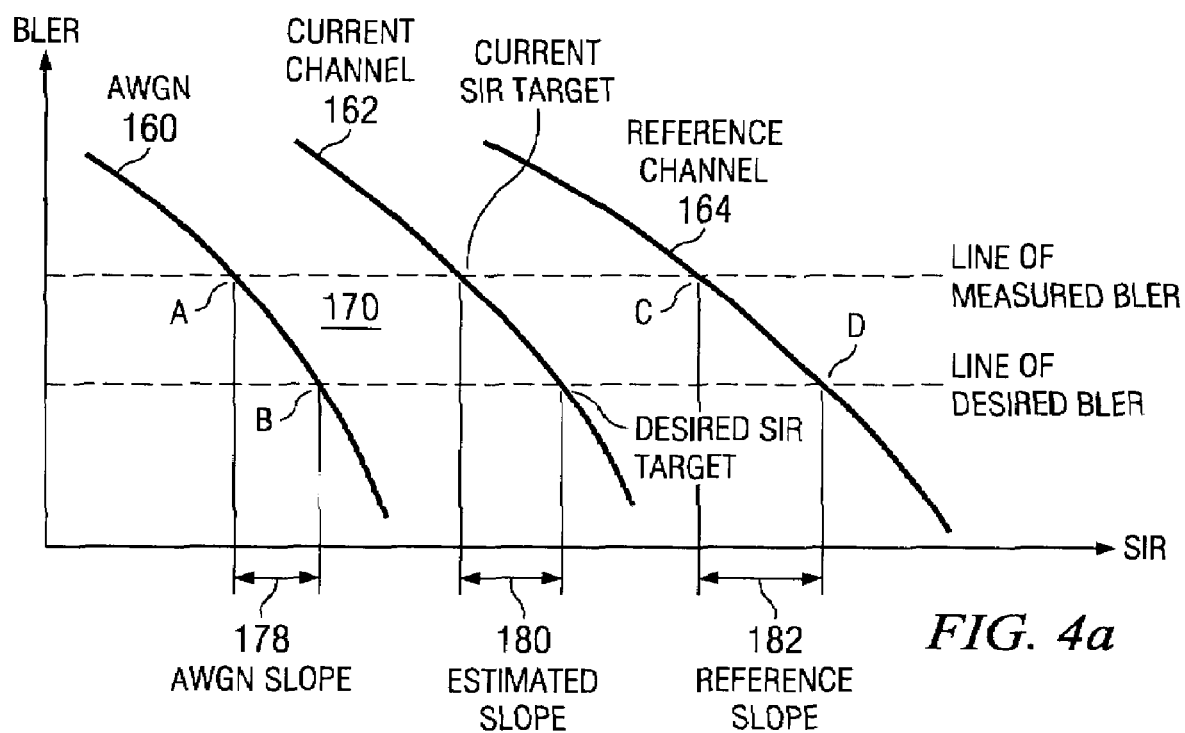
FIGS. 4a-4d illustrates channel curves based on error rate as a function of SIR for use with an embodiment of the present invention.

FIG. 4a illustrates three BLER curves as a function of SIR. A first reference channel curve 160 indicates the performance of the communication channel under a first set of operating conditions. The first reference channel curve 160 shows that a lower BLER requires a higher SIR as would be expected. A second reference channel curve 164 is also illustrated in FIG. 4a. The second reference channel curve 164 illustrates the communication channel under conditions that are worse than those of the first reference channel curve 160. This is clear in that the second reference channel curve 164 shows a higher SIR is required for any given BLER compared to the first reference channel curve 160. The first and second reference channel curves 160, 164 are generated either through modeling of the communication system under certain conditions or are empirically measured.

Between the first and second reference channel curves 160, 164 is a current channel curve 162. The current channel curve 162 represents the BLER as a function of SIR for the communication system under the current operating conditions. The precise location and shape of the current channel curve will be unknown and will change with changes in operating conditions. Under clear conditions with few obstructions and when few other PCDs are in use, the current channel curve 162 will shift to the left, while adverse current conditions that may include many tall buildings at a time when lots of other PCDs are in use, the current channel curve 162 will shift to the right.

As the precise location and shape of the current channel curve 162 changes with time, its location and shape can be estimated with respect to the two reference channel curves 160, 164. By estimating the location and shape of the current channel curve, the present invention can more rapidly converge on the $SIR_{target}$ that is appropriate for the current operating conditions.

In a preferred embodiment, the first reference channel curve 160 corresponds to the communication system operating under ideal conditions. Under ideal conditions, the channel noise will be additive white Gaussian noise (AWGN). Therefore, if the first reference curve is based upon an AWGN channel, the current channel curve 162 will never be further to the left (lower) than the first reference curve 160.

In the preferred embodiment, the second reference channel curve 164 shows the BLER as a function of SIR for the communication system under the worst case operating channel conditions. With the two reference channel curves 160, 164 thus defined, the current channel curve 162 will of necessity fall between the two reference channel curves 160, 164. In other embodiments, other reference curves may be appropriate based upon alternative channel conditions.

Because the current channel curve 162 will have the same general shape as either of the two reference channel curves 160, 164, either or both of the these reference channel curves 160, 164 can be used to estimate the current channel curve 162. In a preferred embodiment of the present invention, an estimated slope of the current channel curve 180 is calculated based upon the actual BLER $Err_{act.}$, the expected BLER $Err_{exp}$, the slope of the first reference channel curve 178, and the slope of the second reference channel curve 182.

Continuing with the example PCD 114 of a cellular telephone 140, the processor/memory unit 146 of the cellular telephone 140 calculates the estimated slope of the current channel curve 180 in a several step process. In a preferred embodiment, the first and second reference channel curves 160, 164 are stored in the processor/memory unit 146 as respective first and second tables. The accuracy of the estimated slope of the current channel will depend upon the number of entries in the first and second tables. Table 1, below, is an example table for the first reference channel curve 160 and shows the SIR required to meet a given BLER under a first set of reference channel conditions, and the corresponding BLER.

TABLE 1

| SIR | BLER |
|---|---|
| 1.2 dB | 1% |
| 1.18 dB | 2% |
| ... | ... |
| 0.8 dB | 10% |

Since the number of entries stored in the tables is fixed, the processor/memory unit 146 will round the actual BLER to a BLER entry found in the tables. In a preferred embodiment, this rounding may take the form of a floor function, rounding to the next lowest BLER. While the preferred embodiment utilizes tables, the first and second reference channel curves 160, 164 may be calculated based on polynomial equations. While calculating the first and second reference channel curves 160, 164 avoids rounding the actual BLER when using tables, it will require additional computation time each time the estimated slope of the current channel curve is computed.

Upon receiving both the actual error rate $Err_{act.}$ and the expected error rate $Err_{exp.}$, the processor/memory unit 146 will calculate a weighting ratio r according to Equation 1:

$$r=(SIR_{target}-SIR_{QoS*})/(SIR_{ref,QoS*}-SIR_{QoS*}).\qquad \text{Eq. 1}$$

Figure 4B:
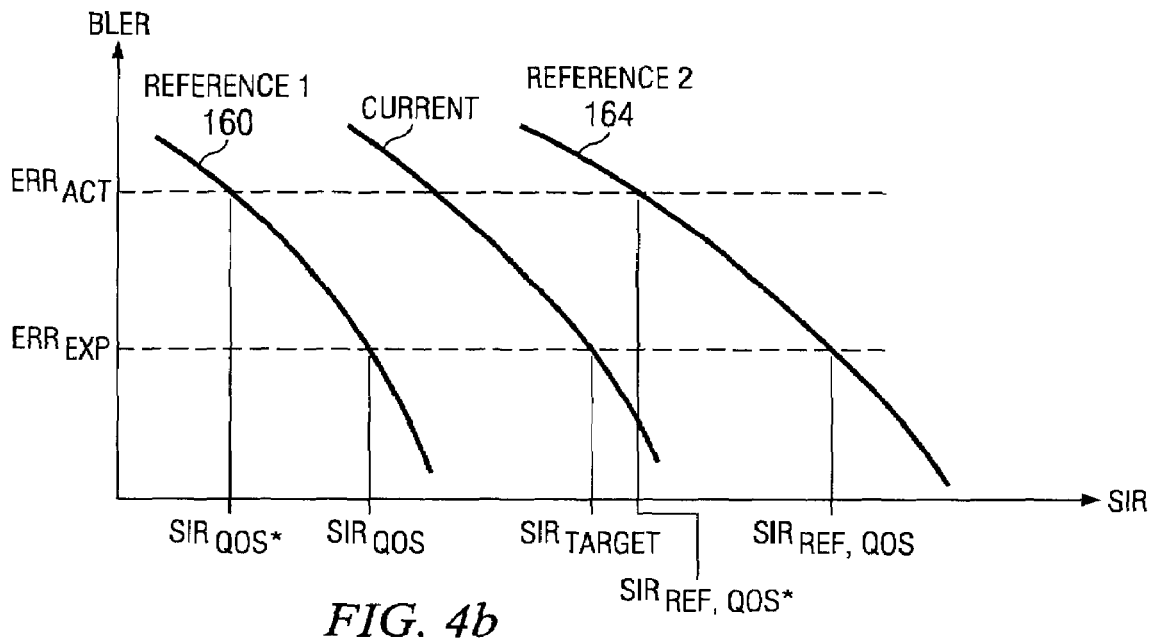

As shown in FIG. 4b, $SIR_{target}$ corresponds to the current target SIR that will be updated when the correction process is completed. $SIR_{QoS*}$ corresponds to the SIR entry in the first reference channel curve 160 table at the BLER corresponding to $Err_{act.}$. Lastly, $SIR_{ref,QoS*}$ corresponds to the SIR entry in the second reference channel curve 164 table at the BLER corresponding to $Err_{act.}$. Referring to FIG. 4a, $SIR_{target}$ corresponds to the point labeled "Current SIR Target", $SIR_{QoS*}$ corresponds to the point labeled A and $SIR_{ref.,QoS*}$ corresponds to the point labeled C.

Figure 4C:
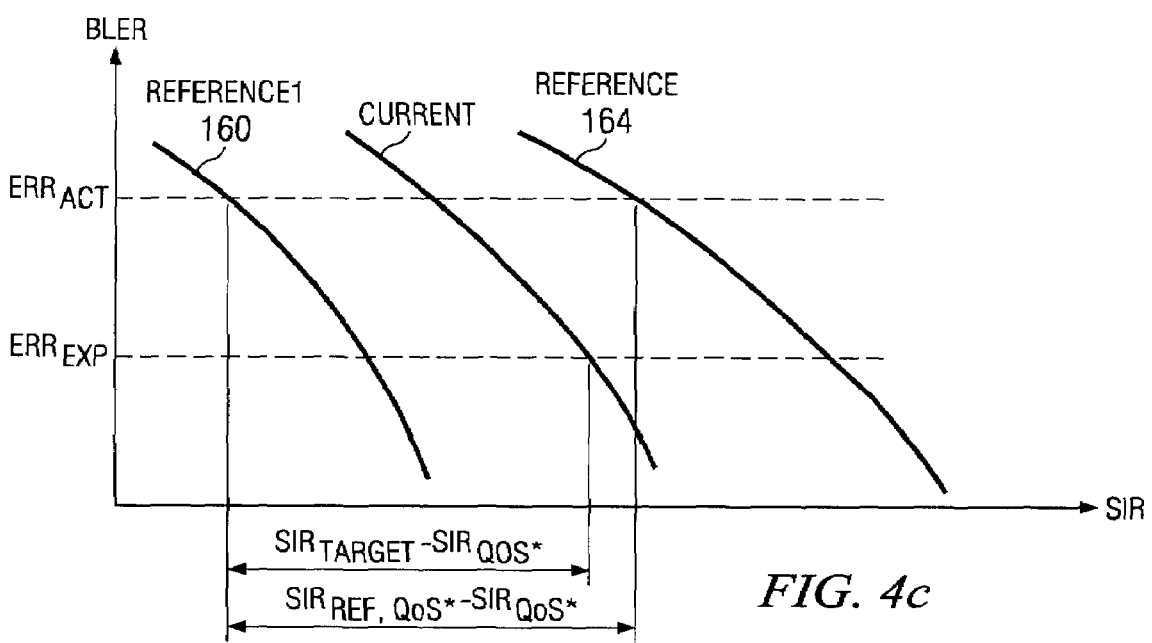

FIG. 4c is provided to more clearly illustrate the two differences used to calculate the weighting factor r in Equation 1. The weighting factor is useful since the shape of the current channel curve 162 will most likely more closely resemble the shape of the reference curve to which it is closest.

Once the weighting ratio r is computed, the estimated slope of the current channel curve, denoted by s and corresponding to 180 in FIG. 4a, is calculated according to Equation 2:

$$s=|(1-r)*(SIR_{QoS}-SIR_{QoS*})+r*(SIR_{ref.,QoS}-SIR_{ref.,QoS*})|. \quad \text{Eq. 2}$$

Figure 4D:
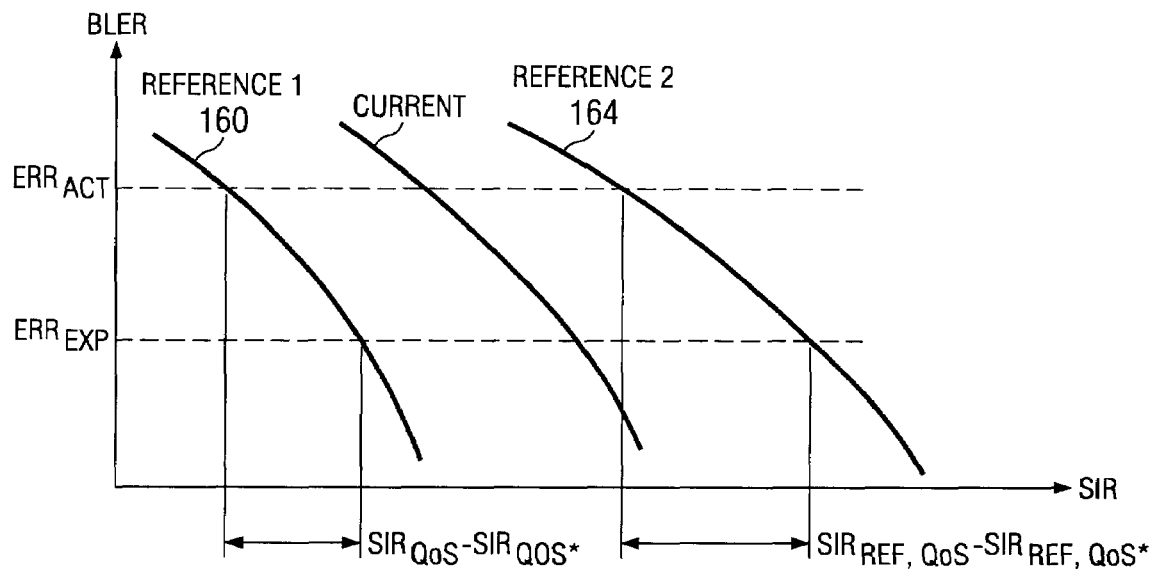

As shown in FIG. 4b, $SIR_{QoS}$ corresponds to the SIR entry in the first reference channel curve 160 at the expected error rate $Err_{exp.}$. $SIR_{ref.,QoS}$ corresponds to the SIR entry in the second reference channel curve 164 at $Err_{exp.}$. Thus, s, the estimated slope of the current channel curve 180 is a weighted average of the first and second reference channel slopes 178, 182. Referring to FIG. 4a, $SIR_{QoS}$ corresponds to the point labeled B and $SIR_{ref.,QoS}$ corresponds to the point labeled D. FIG. 4d is provided to more clearly illustrate the two differences used to calculate the estimated slope s in Equation 2.

If only a single reference curve is used, the calculation of the slope s would be simplified. In this case, the slope would be computed as the difference between SIR at the desired error rate and the SIR at the measured error rate. With only one curve, no weighting factor r would be needed. Similarly, if more than two reference curves were to be used, then a corresponding number of weighting factors would be used.

A SIR correction factor $\Delta_{SIR}$ is computed based upon the estimated slope s according to Equation 3:

$$\Delta_{SIR}=k_1*s, \quad \text{Eq. 3}$$

when the target SIR is to step up and according to Equation 4:

$$\Delta_{SIR}=k_2*s, \quad \text{Eq. 4}$$

when the target SIR is to step down. The factors $k_1$ and $k_2$ correspond to predetermined constants with $k_1>0$ and $k_2<0$. While the magnitude of $k_1$ and $k_2$ may typically range from 0 to 5, in a preferred embodiment the values of $k_1$ and $k_2$ will be in the approximate range of $0.5<k_1<5$ and $-2<k_2<0$. Both $k_1$ and $k_2$ may have the same magnitude and the most typical magnitude is 1 for both.

Lastly, the target SIR $SIR_{target}$ is updated by computing a new target SIR $SIR_{target,new}$ according to Equation 5:

$$SIR_{target,new}=SIR_{target}+\Delta_{SIR}. \quad \text{Eq.5}$$

Referring to FIG. 4a, $SIR_{target,new}$ will rapidly converge on the point labeled with the words "Desired SIR Target" after several updating iterations.

Figure 5:
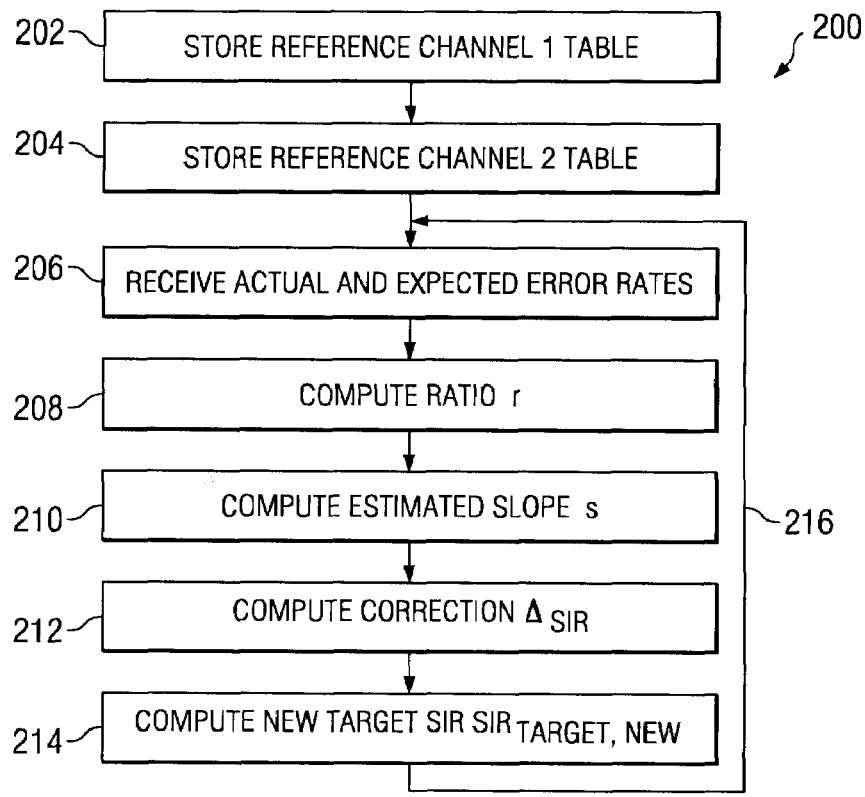
FIG. 5 is a flowchart of an embodiment of the present invention.

FIG. 5 illustrates the overall process flow 200 for finding the estimated slope s and updating the current target SIR $SIR_{target}$ to the new target SIR $SIR_{target,new}$. Step 202 corresponds to storing the first table of SIR and BLER values for the first reference channel curve 160. Step 204 corresponds to storing the second table of SIR and BLER values for the second reference channel curve 164.

In step 206, the actual error rate $Err_{act.}$ and the expected error rate $Err_{exp}$ are received. In step 208, the weighting ratio r is computed according to equation 1. Step 210 corresponds to computing the estimated slope according to equation 2. In step 212, the correction $\Delta_{SIR}$ is computed according to Equations 3 or 4 depending upon the relationship between $Err_{act.}$ and $Err_{exp.}$. In step 214 the current target SIR $SIR_{target}$ is updated to the new target SIR $SIR_{target,new}$ according to equation 5. As the current operating conditions are dynamic, step 216 causes the process steps 206-214 to be repeated, thereby ensuring minimal power-rise.

While FIG. 5 shows only process steps 206-214 being repeated, the first and second reference channel curve 160, 164 tables could be updated as needed. In this case, step 216 would cause process steps 202-214 to be repeated. While steps 202-214 could be repeated each time, it is unlikely that the reference channel curve 160, 164 tables would need updating this frequently. In a preferred embodiment, the first and second reference channel curve 160, 164 tables would be updated as part of the initialization process upon powering up the PCD 114. Furthermore, while a single table for each of the first and second reference channel curves 160, 164 is preferred, a set of tables corresponding to each of the first and second reference channel curves is possible. For example, a first table for the first reference channel curve 160 may span the BLER range of 1-10%, while a second table for the first reference channel curve 160 may span the BLER range of 0.01-1.0%.

In another embodiment of the present invention, the current channel curve 162 is estimated using only one of the reference channel curves 160, 164. For example, the current channel curve is estimated to have the same shape as the first reference channel curve 160, but be shifted to higher SIR values to the right. The advantage of this embodiment is that only a single table need be stored in memory and that no weighting ratio r need be calculated and the estimated slope of the current channel curve 180 will equal the slope of the reference channel curve 178. However, this simplified approach will not converge as rapidly as the weighted, two reference channel curve approach described above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A method for updating a current target signal to interference ratio used to determine a signal level in a communication system, the method comprising:

receiving an actual error rate; and updating the current target signal to interference ratio based on the actual error rate and a slope of at least one reference curve to adjust the signal level, the reference curve correlating error rates as a function of signal to interference ratios for the communication system.

2. A method in accordance with claim 1, wherein the reference curve corresponds to error rates in a channel experiencing an additive white Gaussian noise channel condition.

3. A method in accordance with claim 1, wherein the reference curve corresponds to error rates in a channel experiencing a worst case operating channel condition.

4. A method in accordance with claim 1, wherein the at least one reference curve comprises at least two reference curves.

5. A method in accordance with claim 4, wherein the slope is proportional to the at least two reference curves.

6. A method in accordance with claim 4, wherein the at least two references curves comprise a first reference curve and a second reference curve, the method further comprising:
storing a first table of signal to interference ratios corresponding to the first reference curve; and
storing a second table of signal to interference ratios corresponding to the second reference curve.

7. A method in accordance with claim 4, and further comprising:
determining a weighting ratio based on the at least two reference curves;
determining an estimated slope based on the weighting ratio; and
determining a correction factor based on the estimated slope;
wherein the current target signal to interference ratio is updated based on the correction factor.

8. A method in accordance with claim 7 wherein the weighting ratio is computed according to the equation:

$$r=(SIR_{target}-SIR_{QoS*})/(SIR_{ref.,QoS*}-SIR_{QoS*}),$$

wherein r is the weighting ratio, $SIR_{target}$ is a current signal to interference ratio target, $SIR_{QoS*}$ is a signal to interference ratio derived from a first reference curve and corresponding to the actual error rate and $SIR_{ref.,QoS*}$ is a signal to interference ratio derived from a second reference curve and corresponding to the actual error rate.

9. A method in accordance with claim 8 wherein the estimated slope is computed according to the equation:

$$s=|(1-r)*(SIR_{QoS}-SIR_{QoS*})+r*(SIR_{ref.QoS}-SIR_{ref.,QoS*})|,$$

wherein s is the estimated slope, $SIR_{QoS}$ is a signal to interference ratio derived from the first reference curve and corresponding to an expected error rate and $SIR_{ref.,QoS}$ is a signal to interference ratio derived from the second reference curve and corresponding to the expected error rate.

10. A method in accordance with claim 9 wherein the correction factor is computed as according to the equations:

$$\Delta_{SIR}=k_1*s, \text{ when } Err_{act.} \geq Err_{exp.}$$

$$\Delta_{SIR}=k_2*s, \text{ when } Err_{act.} < Err_{exp.}$$

wherein $\Delta_{SIR}$ is the correction factor, $k_1$ is a first factor and $k_2$ is a second factor.

11. A method in accordance to claim 10 wherein a magnitude of the first factor $k_1$ is equal to a magnitude of the second factor $k_2$.

12. A method in accordance to claim 11 wherein the magnitude of the first factor $k_1$ is equal to one.

13. A method in accordance to claim 10 wherein values of $k_1$ and $k_2$ are in the approximate range of $0.5 < k_1 < 5$ and $-2 < k_2 < 0$.

14. A method for updating a current target signal to interference ratio in a spread spectrum communication system, the method comprising:
storing at least a first table of signal to interference ratios as a function of error rates for the spread spectrum communication system under a first reference channel condition;
storing at least a second table of signal to interference ratios as a function of error rates for the spread spectrum communication system under a second reference channel condition;
receiving an actual error rate;
receiving an expected error rate;
computing a weighting ratio as a function of a current target signal to interference ratio, a signal to interference ratio from the at least first table corresponding to the actual error rate and a signal to interference ratio from the at least second table corresponding to the actual error rate;
computing an estimated slope as a function of the weighting ratio, a signal to interference ratio from the at least first table corresponding to the expected error rate, the signal to interference ratio from the at least first table corresponding to the actual error rate, a signal to interference ratio from the at least second table corresponding to the expected error rate and the signal to interference ratio from the at least second table corresponding to the actual error rate;
computing a correction factor as a function of the weighting ratio, the estimated slope and a first predetermined constant when the actual error is greater than the expected error, and as a function of the weighting ratio, the estimated slope and a second predetermined constant when the actual error is less than the expected error; and
updating the current target signal to interference ratio as a function of the current target signal to interference ratio and the correction factor.

15. A method in accordance with claim 14, wherein the weighting ratio is computed according to the equation:

$$r=(SIR_{target}-SIR_{QoS*})/(SIR_{ref.,QoS*}-SIR_{QoS*}),$$

wherein r corresponds to the weighting ratio, $SIR_{target}$ corresponds to the current target signal to interference ratio, $SIR_{QoS*}$ corresponds to the signal to interference ratio from the at least first table corresponding to the actual error rate and $SIR_{ref.,QoS*}$ corresponds to the signal to interference ratio from the at least second table corresponding to the actual error rate.

16. A method in accordance with claim 14, wherein the estimated slope is computed according to the equation:

$$s=|(1-r)*(SIR_{QoS}-SIR_{QoS*})+r*(SIR_{ref.QoS}-SIR_{ref.,QoS*})|,$$

wherein s corresponds to the estimated slope, r corresponds to the weighting ratio, $SIR_{QoS}$ corresponds to the signal to interference ratio from the at least first table corresponding to the expected error rate, $SIR_{QoS*}$ corresponds to the signal to interference ratio from the at least first table corresponding to the actual error rate, $SIR_{ref.,QoS}$ corresponds to the signal to interference ratio from the at least second table corresponding to the expected error rate and $SIR_{ref.,QoS*}$ corresponds to the signal to interference ratio from the at least second table corresponding to the actual error rate.

17. A method in accordance with claim 14, wherein the correction factor is computed according to the equation:

$$\Delta_{SIR}=k_1 *s,$$

when the actual error is greater than the expected error and the correction factor is computed according to the equation:

$$\Delta_{SIR}=k_2 *s,$$

when the actual error is less than the expected error, wherein $\Delta_{SIR}$ corresponds to the correction factor, $k_1$ corresponds to the first predetermined constant, $k_2$ corresponds to the second predetermined constant and s corresponds to the estimated slope.

18. A method in accordance with claim 17, wherein $k_1 \leq 0$ and $k_2 < 0$.

19. A method in accordance with claim 14, wherein the current target signal to interference ratio is updated according to the equation:

$$SIR_{target,new}=SIR_{target}+\Delta_{SIR},$$

wherein $SIR_{target,new}$ corresponds to the new target signal to interference ratio, $SIR_{target}$ corresponds to the current target signal to interference ratio and $\Delta_{SIR}$ corresponds to the correction factor.

20. A method in accordance with claim 14, wherein the first reference channel condition corresponds to an additive white Gaussian noise channel condition.

21. A method in accordance with claim 20, wherein the second reference channel condition corresponds to a worst case operating channel condition.

22. A method for updating a target signal to interference ratio in a communication system, the method comprising:
determining a signal to interference ratio for the communication system under a first reference channel condition corresponding to an actual error rate;
determining a signal to interference ratio for the communication system under the first reference channel condition corresponding to an expected error rate;
determining a signal to interference ratio for the communication system under a second reference channel condition corresponding to the actual error rate;
determining a signal to interference ratio for the communication system under the second reference channel condition corresponding to the expected error rate;
determining a weighting ratio as a function of a current target signal to interference ratio, the signal to interference ratio for the communication system under the first reference channel condition corresponding to the actual error rate, and the signal to interference ratio for the communication system under the second reference channel condition corresponding to the expected error rate;
determining an estimated slope as a function of the weighting ratio, the signal to interference ratio for the communication system under the first reference channel condition corresponding to the actual error rate, the signal to interference ratio for the communication system under the first reference channel condition corresponding to the expected error rate, the signal to interference ratio for the communication system under the second reference channel condition corresponding to the actual error rate and the signal to interference ratio for the communication system under the second reference channel condition corresponding to the expected error rate;
determining a correction factor as a function of the estimated slope and a first predetermined constant when the actual error is greater than the expected error and as a function of the estimated slope and a second predetermined constant when the actual error is less than the expected error; and
updating the current target signal to interference ratio based upon the correction factor.

23. A personal communication device comprising:
an antenna;
a signal input/output section;
a display;
a keypad; and
a data processor configured to update a current target signal to interference ratio (SIR) based on an actual error rate and a slope of at least one reference curve that corresponds to error rates as a function of signal to interference ratio for a communication system that includes the personal communication device.

24. The device of claim 23 wherein the data processor is adapted to update the current target SIR based upon two reference curves, each reference curve corresponding to an error rate as a function of signal to interference ratio for a different set of channel conditions.

25. The device of claim 24 wherein the data processor is adapted to compute a weighting ratio based on the two reference curves, compute an estimated slope based on the weighting ratio, and compute a correction factor based on the estimated slope, wherein the current target signal to interference ratio is updated based on the correction factor.

26. The device of claim 23 wherein the personal communication device comprises a cellular telephone.

27. The device of claim 26 wherein the personal communication device comprises a CDMA cellular telephone.

28. An apparatus for use in a communication system, the apparatus comprising:
means for determining an estimated slope based on a first reference curve and a second reference curve, the first reference curve based on error rates as a function of signal to interference ratio (SIR) under a first channel condition and the second reference curve based on error rates as a function of SIR under a second channel condition;
means for determining a correction factor based on the estimated slope; and
means for determining a current target signal to interference ratio based on an actual error rate and the correction factor.

29. The apparatus of claim 28 and further comprising means for determining a weighting ratio based on the first and second reference curves wherein the estimated slope is based on the weighting ratio.

* * * * *